US011877682B1

(12) United States Patent
Yang

(10) Patent No.: US 11,877,682 B1
(45) Date of Patent: Jan. 23, 2024

(54) ARTIFICIAL TREE BRANCH WITH STRING LIGHTS

(71) Applicant: Ping Yang, Dongguan (CN)

(72) Inventor: Ping Yang, Dongguan (CN)

(*) Notice: Subject to any disclaimer, the term of this patent is extended or adjusted under 35 U.S.C. 154(b) by 0 days.

(21) Appl. No.: 18/058,822

(22) Filed: Nov. 25, 2022

(51) Int. Cl.
*A47G 33/06* (2006.01)
*F21S 4/10* (2016.01)
*H05B 45/48* (2020.01)
*F21Y 115/10* (2016.01)
*H05B 45/00* (2022.01)

(52) U.S. Cl.
CPC ................ *A47G 33/06* (2013.01); *F21S 4/10* (2016.01); *H05B 45/48* (2020.01); *F21Y 2115/10* (2016.08); *H05B 45/00* (2020.01)

(58) Field of Classification Search
CPC ............ A47G 33/06; F21S 4/10; H05B 45/48
See application file for complete search history.

(56) References Cited

U.S. PATENT DOCUMENTS 7,267,852 B1* 9/2007 Rosado .................. A47G 33/06 428/20
2007/0041189 A1* 2/2007 Mchinnis .................. F21S 4/10 362/249.04
2015/0164164 A1* 6/2015 Trotter ................... A47G 33/06 362/123
2015/0217016 A1* 8/2015 McKay ............. A47G 33/0854 239/37
2019/0316743 A1* 10/2019 Planinsek ............. F21V 21/088
2020/0128994 A1* 4/2020 Ford ....................... A47G 33/08
2020/0146493 A1* 5/2020 Loomis .................. H05B 45/20

FOREIGN PATENT DOCUMENTS

CN 216202689 U 4/2022

* cited by examiner

*Primary Examiner* — Bryon T Gyllstrom
(74) *Attorney, Agent, or Firm* — Sinorica International

(57) ABSTRACT

The invention discloses an artificial tree branch with string lights, comprising a main stem, a wood grain strip and string lights. The wood grain strip comprises a wrapped wire and a plurality of decorated blades. The wrapped wire is spirally wrapped on the main stem. The plurality of the decorated blades is integrally formed with the wrapped wire and extended far away from a side of the main stem. The string lights each comprise a lead and a plurality of lamp beads. Each of the lamp beads is electrically connected to the lead. The lead is spirally wrapped on the main stem and interlaced with the wrapped wire.

18 Claims, 8 Drawing Sheets

ARTIFICIAL TREE BRANCH WITH STRING LIGHTS

BACKGROUND OF THE INVENTION

1. Field of the Invention

The present invention relates to a decoration, in particular to an artificial tree branch with string lights.

2. Description of the Related Art

At Christmas, people usually use a pine and an artificial tree branch to decorate a Christmas tree. The artificial tree branch is cut into several parts of a same length and then hung on the Christmas tree. Furthermore, string lights are hung on the artificial tree branch to embellish and decorate the Christmas tree for creating a delighting festival atmosphere.

Since the common artificial tree branch and the common string lights are disposed separately, the artificial tree branch or a decoration for decorating the Christmas tree fails to emit light. Therefore, the string lights need to be respectively disposed. However, exposed leads of the string lights have no aesthetical appeal and are prone to pulling by children. Hence, the exposed leads of the string lights have poor protection and may leak current.

Accordingly, how to provide an artificial tree branch with string lights to solve the problems mentioned above is an urgent subject to tackle.

SUMMARY OF THE INVENTION

In view of this, the present invention provides an artificial tree branch with string lights to solve the problems mentioned above.

The artificial tree branch with string lights comprises a main stem, at least one wood grain strip, and the string lights.

The wood grain strip comprises a wrapped wire and a plurality of decorated blades. The wrapped wire is spirally wrapped on the main stem. The decorated blades are integrally formed with the wrapped wire, and are extended toward a side far away from the main stem.

Each of the string lights comprises a lead and a plurality of lamp beads. The plurality of the lamp beads are electrically connected to the lead. The lead is spirally wrapped on the main stem, and is interlaced with the wrapped wire.

Preferably, the artificial tree branch with string lights comprises a plurality of the wood grain strips. The wood grain strips are spirally wrapped on the main stem via the wrapped wire, and the wood grain strips are interlaced with each other.

Preferably, the decorated blades are disposed at two sides of the wrapped wire at an interval.

Preferably, the decorated blades are disposed at an irregular interval.

Preferably, the wood grain strip is composed of polyvinyl chloride (PVC).

Preferably, the main stem comprises at least one iron wire. The at least one iron wire is spirally wrapped with the string lights. The wrapped wire is disposed between the iron wire and the string lights.

Preferably, each of the lamp beads comprises an LED patch and encapsulating gel. The LED patch is electrically connected to the lead. The LED patch is encapsulated by the encapsulating gel.

Preferably, the lead has a plurality of mounting areas. The plurality of mounting areas are disposed along an axis of the lead. The LED patch is soldered on the mounting area.

Preferably, the lead comprises a positive wire, a first signal wire, a second signal wire, a negative wire, and an insulating layer. The insulating layer separately encapsulates the positive wire, the first signal wire, the second signal wire, and the negative wire to isolate the positive wire, the first signal wire, the second signal wire, and the negative wire.

Each of the mounting areas is composed of a positive solder point, a first signal solder point, a second signal solder point, and a negative solder point. The positive solder points are disposed to contact the positive wire. The first signal solder points are disposed to contact the first signal wire. The second signal solder points are disposed to contact the second signal wire. The negative solder points are disposed to contact the negative wire. The first signal wire between the two first signal solder points and the second signal wire between the two second signal solder points are alternately disconnected along a length direction of the string lights.

The plurality of LED patches comprises a plurality of first LED patches and a plurality of second LED patches. The plurality of first LED patches and the plurality of second LED patches are alternately disposed along the axis of the lead. Furthermore, the plurality of the first LED patches and the plurality of the second LED patches are electrically connected to each other in series. Each of the first LED patches and each of the second LED patches respectively have a positive solder pin, a signal inputting solder pin, a signal outputting solder pin, and a negative solder pin. The positive solder pins of the first LED patches and the second LED patches are soldered on the positive solder points of the mounting areas. The negative solder pins of the first LED patches and the second LED patches are soldered on the negative solder points of the mounting areas. The signal inputting solder pins of the first LED patches are soldered on the first signal solder points of the mounting areas. The signal outputting solder pins of the first LED patches are soldered on the second signal solder points of the mounting areas. Next, the signal inputting solder pins of the second LED patches are soldered on the second signal solder points of the mounting areas. The signal outputting solder pins of the second LED patches are soldered on the first signal solder points of the mounting areas.

Namely, one of the signal outputting solder pins of the first LED patches is electrically connected to one of the signal inputting solder pins of the second LED patches via the second signal wire. One of the signal outputting solder pins of the second LED patches is electrically connected to one of the signal inputting solder pins of the first LED patches via the first signal wire.

Further, since the first signal wire between the two first signal solder points and the second signal wire between the two second signal solder points are alternately disconnected, segments of the first signal wire between the first LED patches and the second LED patches are alternately disconnected. Similarly, segments of the second signal wire between the first LED patches and the second LED patches are alternately disconnected. That is, the first signal wire between the two adjacent first signal solder points and the second signal wire mounted between the two adjacent second signal solder points are alternately disconnected along the axis of the lead. By this way, the signal can be transmitted from the first LED patch to the second LED patch along the axis of the lead and so forth.

Preferably, the positive solder point, the first signal solder point, the second signal solder point, and the negative solder point are formed in a folded shape.

The string lights are selected from a leather thread lamp or a copper wire lamp. In a processing procedure, the string lights with the wood grain strip are wrapped on the main stem via a winding machine. Therefore, the artificial tree branch with the string lights is capable of emitting light. The artificial tree branch with the string lights as a decoration not only has aesthetical appeal, but also saves time since the artificial tree branch and the string lights are unnecessary to be decorated. Moreover, it is convenient for the user since the problem that the string lights are interlaced with the artificial tree branch can be solved. Furthermore, after the string lights are wrapped on the artificial tree branch, the decorated blade extended outward shields the lead of the string lights. Accordingly, the aesthetical appeal is improved. The lead and the main stem enhance stress resistance and tensile property of the string lights so that strength of the string lights is upgraded.

DETAILED DESCRIPTION OF THE INVENTION

Figure 1:
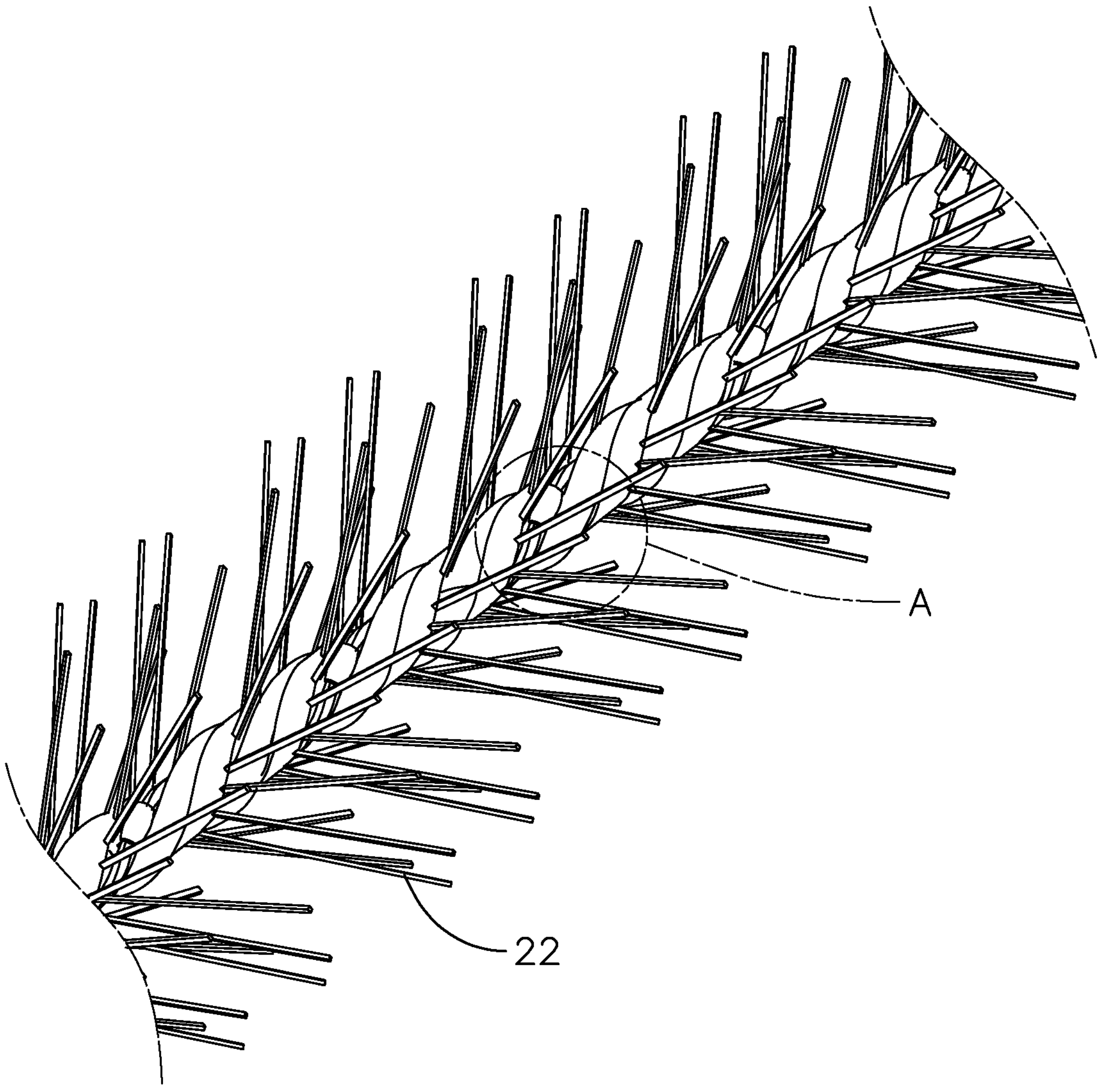
FIG. 1 is the structure schematic diagram of the artificial tree branch with string lights of the present invention.
Figure 2:
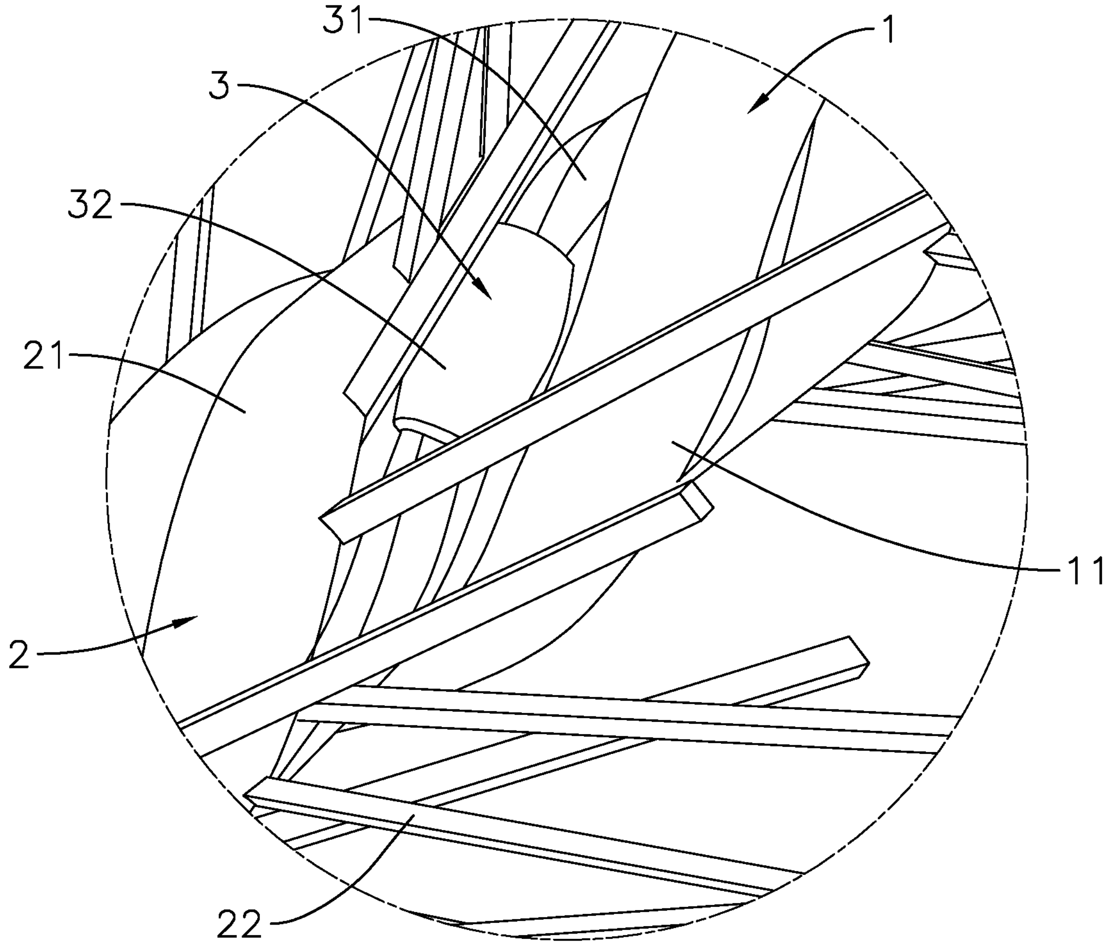
FIG. 2 is the enlarged schematic diagram of the symbol A in FIG. 1.
Figure 3:
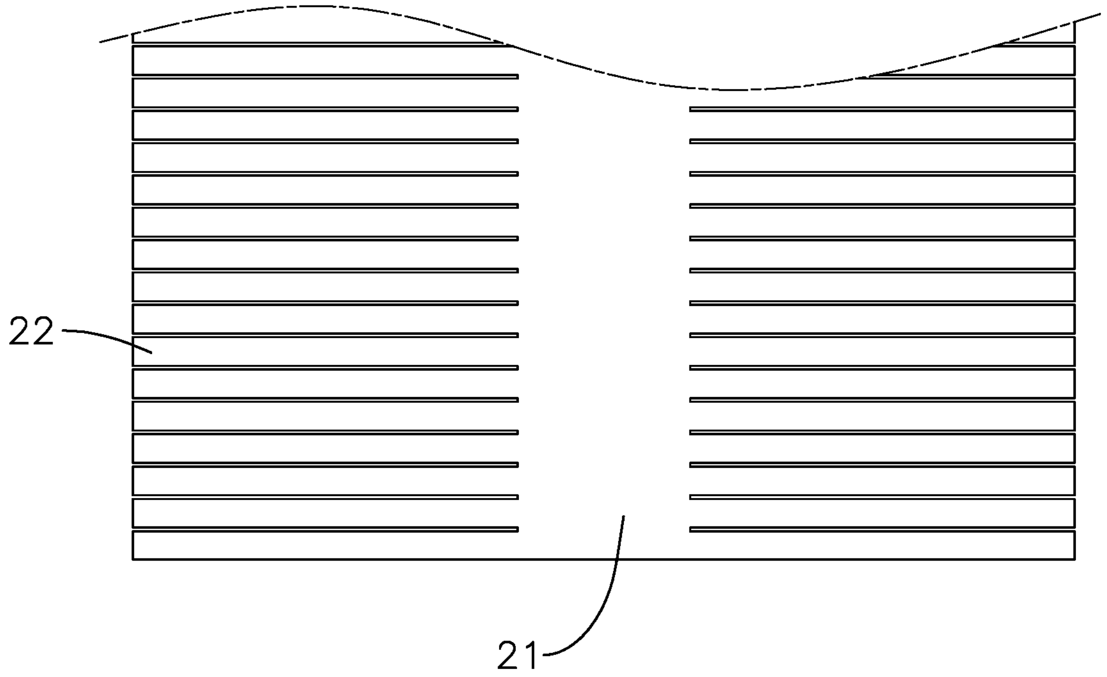
FIG. 3 is the structure schematic diagram after the wood grain strip is trimmed.
Figure 4:
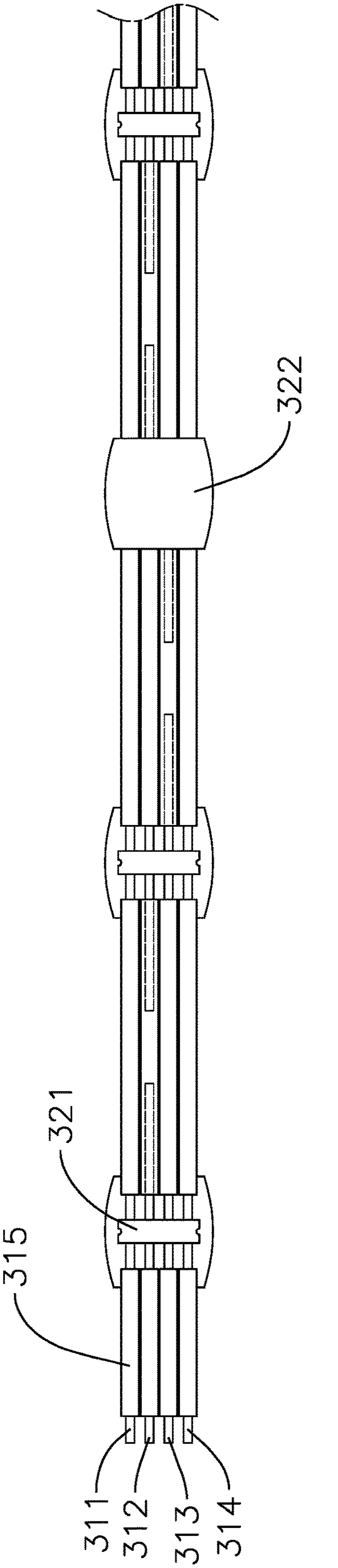
FIG. 4 is the structure schematic diagram of the string lights.
Figure 5:
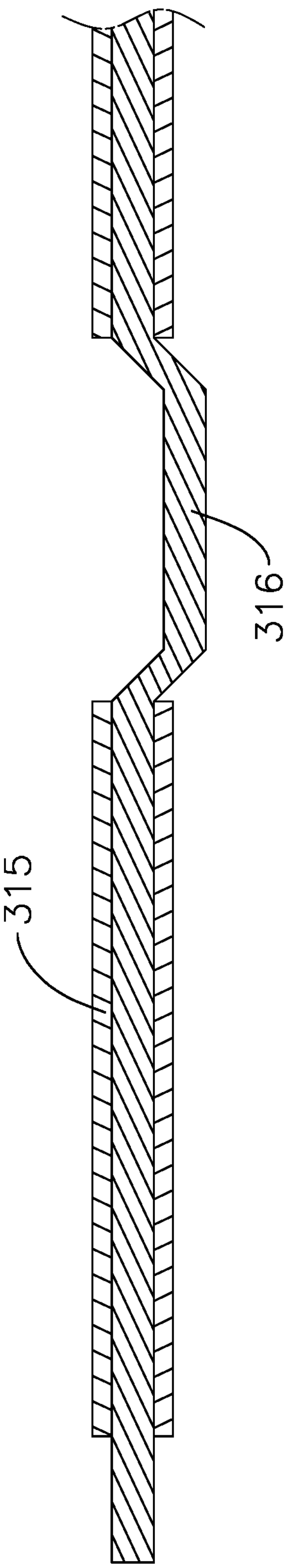
FIG. 5 is the structure schematic diagram of the mounting area.

In order to make the purpose, technical solutions and advantages of the present invention clearer, the present invention will be described in further detail below in conjunction with the accompanying drawings and embodiments. It should be understood that the specific embodiments described herein are only used to explain the present invention. It is not intended to limit the present invention.

It should be noted that when an element is referred to as being "fixed to" or "disposed on" another element, it may be directly on the other element or an intervening element may be present at the same time. When an element is referred to as being "connected to" another element, it may be directly connected to another element or there may be an intervening element at the same time.

Furthermore, the terms "first", "second" are used for descriptive purposes only and should not be understood as indicating or implying relative importance or implying the number of technical features indicated. Thus, the term "first" and "second" may expressly or implicitly comprise one or more of the features. In the description of the present invention, "a plurality" means two or more, unless otherwise expressly and specifically defined.

In the description of the embodiments of the present invention, it should be understood that "upper", "lower", "front", "rear", "left", "right", "top", "bottom", "inside", the orientation or positional relationship indicated by "outside" is based on the orientation or positional relationship shown in the accompanying drawings, which is only for the convenience of describing the embodiments of the present invention and simplifying the description, rather than indicating or implying that the indicated device or element must have a specific orientation, or be constructed and operated in a specific orientation, so it cannot be understood as a limitation to the present invention.

In order to illustrate the technical solution of the present invention more clearly, a preferred embodiment is provided below. Refer to FIG. 1 to FIG. 5. The artificial tree branch with string lights 3 comprises a main stem 1, a wood grain strip 2, and string lights 3. The wood grain strip 2 comprises a wrapped wire 21 and a plurality of decorated blades 22. The wrapped wire 21 is spirally wrapped on the main stem 1. The plurality of the decorated blades 22 is integrally formed with the wrapped wire 21 and is extended far away from a side of the main stem 1.

The string lights 3 each comprise a lead 31 and a plurality of lamp beads 32. Each of the lamp beads 32 is electrically connected to the lead 31. The lead 31 is spirally wrapped on the main stem 1 and is interlaced with the wrapped wire 21.

In the manufacture process for the artificial tree branch, the string lights 3 and the wood grain strip 2 are intertwined on the main stem 1 by a winding machine. Accordingly, the artificial tree branch with the string lights 3 is capable of emitting light. The artificial tree branch with the string lights as a decoration not only has aesthetical appeal, but also saves time since the artificial tree branch and the string lights 3 do not need decorating. Moreover, it is convenient for the user since the problem that the string lights 3 are interlaced with the artificial tree branch can be solved. Furthermore, after the string lights 3 are wrapped on the artificial tree branch, the decorated blade 22 extended outward shields the lead 31 of the string lights 3. Accordingly, aesthetical appeal is promoted. The lead 31 and the main stem 1 enhance stress resistance and tensile property of the string lights 3 so that strength of the string lights 3 is upgraded.

In an embodiment, the string lights 3 comprises a leather thread lamp or a copper wire lamp.

Alternately, the whole or two terminals of the wrapped wire and the string lights 3 are coated by gel. Consequently, after the wrapped wire and the string lights 3 are wrapped on the main stem 1, combined with the main stem 1 by gel to prevent the wrapped wire and the string lights 3 separating with the main stem 1.

In a preferred embodiment, the artificial tree branch with string lights has a plurality of the wood grain strips 2. The plurality of the wood grain strips 2 are spirally wrapped on the main stem 1 by the wrapped wire. In addition, the plurality of the wood grain strips 2 are intersected on the main stem 1. According to varying demands, the user can select different amounts and colors of the wood grain strip 2 to wrap the wood grain strip 2 on the main stem 1. Consequently, the artificial tree branch with string lights has diversity to satisfy distinct needs.

In a preferred embodiment, the plurality of the decorated blades 22 are disposed at two sides of the wrapped wire 21 at an interval. The winding machine for manufacturing the artificial tree branch with string lights performs an act of cutting. Two sides of the wood grain strip 2 are trimmed by motion of cutting the plurality of the decorated blades 22.

In a preferred embodiment, the wood grain strip is composed of polyvinyl chloride (PVC).

In a preferred embodiment, the main stem 1 comprises at least one iron wire 11. The at least one the iron wire 11 is spirally wrapped with the string lights 3. The wrapped wire 21 is disposed between the iron wire 11 and the string lights 3. It should be illustrated that a copper wire for signal transmission is disposed in the lead 31. After the copper wire is interlocked with the iron wire 11, the copper wire is firmly connected with the iron wire 11. Since the wrapped wire 21 is clipped between the copper wire and the iron wire 11, the wrapped wire 21, the copper, and the iron wire 11 are firmly connected to each other.

In a prefer embodiment, the amount of the iron wire 11 is two. The wrapped wire 21 and the string lights 3 are disposed between the two iron wires 11. According to the above sequence, the wrapped wire 21, the copper, and the iron wire 11 are transmitted to the winding machine to be manufactured. After the procedure, the iron wire 11, the wrapped wire 21 and the string lights 3 are spirally wrapped to each other. The two iron wires 11 respectively clip the wrapped wire 21 and the string lights 3 to prevent the wrapped wire 21 or the string lights 3 from detaching from the iron wire 11.

In a preferred embodiment, each of the lamp beads 32 comprises an LED patch 321 and encapsulating gel 322. The LED patch 321 is electrically connected to the lead 31. The encapsulating gel 322 encapsulates the LED patch 321.

In a preferred embodiment, the lead 31 comprises a plurality of mounting areas 316. Each of the mounting areas 316 is disposed along the axis of the lead 31. Each of the LED patches 321 is soldered on each of the mounting areas 316.

Alternately, the plurality of the LED patches 321 are electrically connected to each other in series, in parallel, or in parallel and series.

Figure 6:
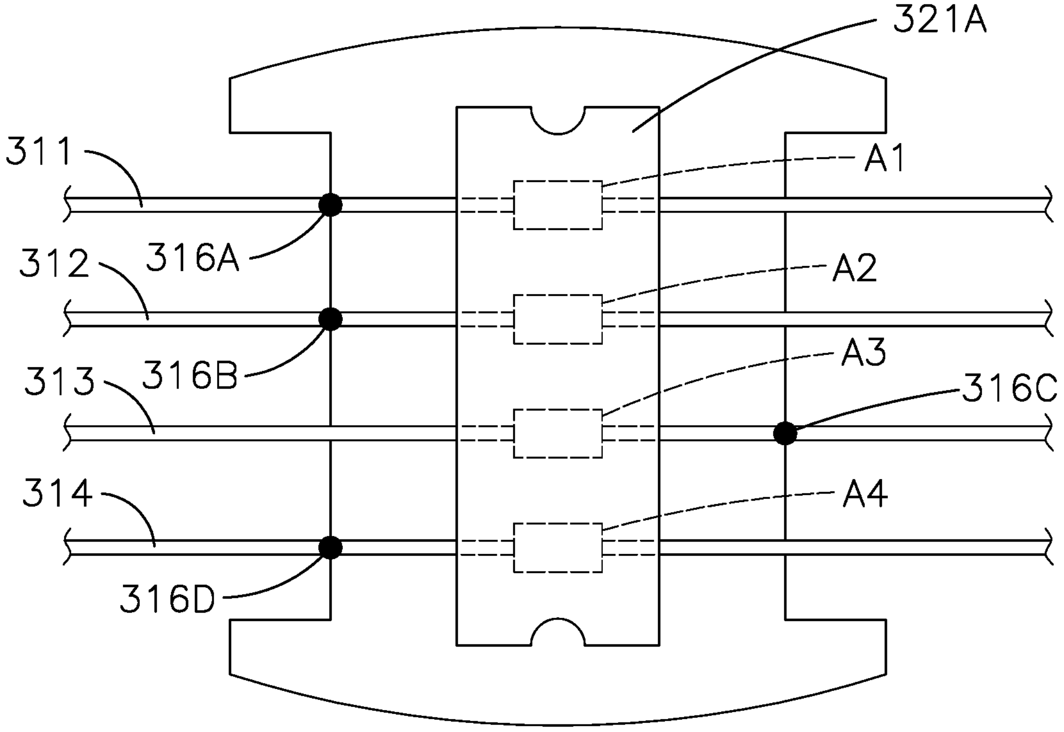
FIG. 6 and FIG. 7 are the structure schematic diagrams that the LED patches are respectively connected to the lead.
Figure 7:
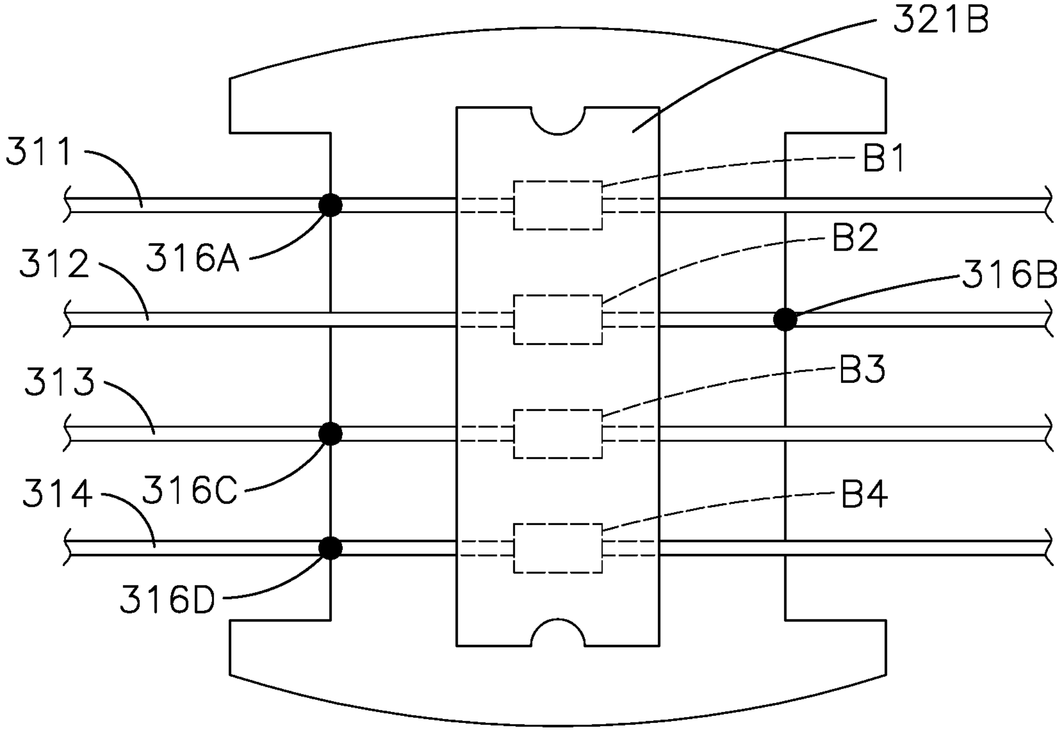
Figure 8:
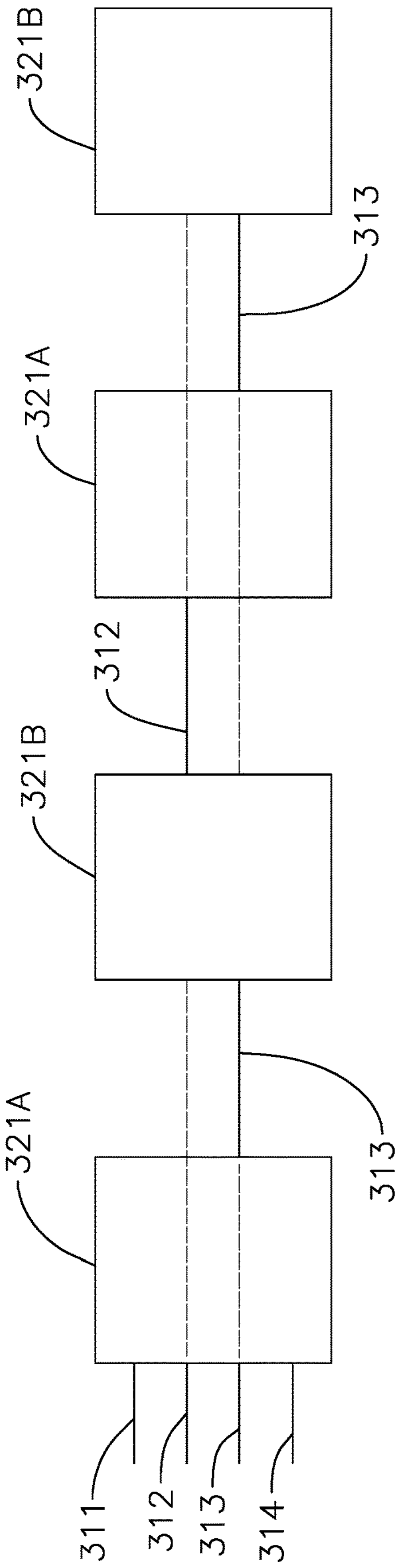
FIG. 8 is the structure schematic diagram of a plurality of the LED patches respectively disposed on the mounting areas in series.

Refer to FIG. 6 to FIG. 8. FIG. 6 and FIG. 7 are the structure schematic diagrams that the LED patches are respectively connected to the lead. FIG. 8 is the structure schematic diagram of a plurality of the LED patches respectively disposed on the mounting areas in series.

The lead 31 comprises a positive wire 311, a first signal wire 312, a second signal wire 313, a negative wire 314 and an insulating layer 315. The insulating layer 315 encapsulates the positive wire 311, the first signal wire 312, the second signal wire 313, and the negative wire 314 to isolate the positive wire 311, the first signal wire 312, the second signal wire 313, and the negative wire 314. For example, the insulating layer 315 comprises a plurality of insulating tubes. The plurality of insulating tubes respectively encapsulate the positive wire 311, the first signal wire 312, the second signal wire 313, and the negative wire 314.

The mounting area 316 is composed of a positive solder point 316A, a first signal solder point 316B, a second signal solder point 316C, and a negative solder point 316D. The positive solder point 316A is disposed to contact the positive wire 311. The first signal solder point 316B is disposed to contact the first signal wire 312. The second signal solder point 316C is disposed to contact the second signal wire 313. The negative solder point 316D is disposed to contact the negative wire 314. The first signal wire 312 between the two first signal solder points 316B and the second signal wire 313 between the two second signal solder points 316C are alternately disposed along the axis of the lead 31.

The plurality of LED patches 321 comprises a plurality of first LED patches and a plurality of second LED patches. The plurality of first LED patches and the plurality of second LED patches are alternately disposed along with the axis of the lead 31. Furthermore, the plurality of the first LED patches and the plurality of the second LED patches are electrically connected to each other in series.

Each of the first LED patches 321A and each of the second LED patches 321B respectively have a positive solder pin A1, B1, a signal inputting solder pin A2, B2, a signal outputting solder pin A3, B3, and a negative solder pin A4, B4. The positive solder pins A1, B1 of the first LED patches 321A and the second LED patches 312B are soldered on the positive solder points 316A of the mounting areas 316. The negative solder pins A4, B4 of the first LED patches 321A and the second LED patches 312B are soldered on the negative solder points 316D of the mounting areas 316. The signal inputting solder pins A2 of the first LED patches 321A are soldered on the first signal solder points 316B of the mounting areas 316. The signal outputting solder pins A3 of the first LED patches 321A are soldered on the second signal solder points 316C of the mounting areas 316. Next, the signal inputting solder pins B2 of the second LED patches 321B are soldered on the second signal solder points 316C of the mounting areas 316. The signal outputting solder pins B3 of the second LED patches 321B are soldered on the first signal solder points 316B of the mounting areas 316.

Namely, one of the signal outputting solder pins A3 of the first LED patches 321A is electrically connected to one of the signal inputting solder pins B2 of the second LED patches 321B via the second signal wire 313. One of the signal outputting solder pins B3 of the second LED patch 321B is electrically connected to one of the signal inputting solder pins A2 of the first LED patches 321A via the first signal wire 312.

Further, since the first signal wire 312 between the two first signal solder points 316B and the second signal wire 313 between the two second signal solder points 316C are alternately disconnected, segments of the first signal wire 312 between the first LED patches 321A and the second LED patches 321B are alternately disconnected. Similarly, segments of the second signal wire 313 between the first LED patches 321A and the second LED patches 321B are alternately disconnected. That is, the first signal wire 312 between the two adjacent first signal solder points 316B and the second signal wire 313 mounted between the two adjacent second signal solder points 316C are alternately disconnected along the axis of the lead 31. By this way, the signal can be transmitted from the first LED patches 321A to the second LED patches 321B along the axis of the lead 31 and so forth.

When the artificial tree branch with string lights is utilized, a positive terminal of a driving power is electrically connected to the positive wire 311. A negative terminal of the driving power is electrically connected to the negative wire 314. A signal outputting terminal of the driving power is electrically connected to the first signal wire 312 or the second signal wire 313. A controlling signal of the driving power comprises a plurality of data sections. Each data section comprises a first data set, a second data set, a third data set, to an nth data set. In addition, each LED patch 321 comprises a driving chip and a light-emitting chip. The driving chip is electrically connected to the light-emitting chip. When the controlling signal of the driving power is inputted to a driving chip of the first LED patch 321, the driving chip of the first LED patch 321 accesses the first data set and transmits the other data sets via the first signal wire 312 or the second signal wire 313. The driving chip is enabled according to the first data set to control the light-emitting chip of the LED patch 321. The driving chip of the second LED patch 321 accesses the second data set and transmits other data sets to other LED patch 321. The driving chip is enabled according to the second data set to control the light-emitting chip of the second LED patch 321 and so on. By this way, the driving chip can control the nth of the lamp beads 32 to emit light.

In a preferred embodiment, the positive solder point, the first signal solder point, the second signal solder point, and the negative solder point are formed in a folded shape. The insulating layer 315 is divided into a plurality of sections by the plurality of the mounting areas 316 so that friction between the insulating layer 315 with the positive wire 311, the first signal wire 312, the second signal wire 313, and the negative wire 314 can be diminished. In addition, since the insulating layer 315 is able to slide along the axis of the lead 31, the insulating layer 315 is clamped via the folded shape formed by the positive solder point, the first signal solder point, the second signal solder point, and the negative solder point. Therefore, the insulating layer 315 is fixed to avoid sliding.

The invention relates to an artificial tree branch with string lights, which solves the problem that the conventional artificial tree branch and string lights are independently disposed. Moreover, the invention solves the problem that the conventional artificial tree branch or the decoration for decorating the Christmas tree fails to emit light such that the string lights are extra disposed. The invention further solves the problem that the exposed lead of the string lights has no aesthetical appeal, is prone to pulling by children, has poor protection, and may leak current.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An artificial tree branch with string lights, the artificial tree branch comprising:
- a main stem;
- at least one wood grain strip, comprising:
  - a wrapped wire, spirally wrapped on the main stem; and
  - a plurality of decorated blades, integrally formed with the wrapped wire and extended far away from a side of the main stem;
- wherein the string lights each comprise:
  - a lead, spirally wrapped on the main stem and interlaced with the wrapped wire; and
  - a plurality of lamp beads, electrically connected to the lead.

2. The artificial tree branch as claimed in claim 1, further comprising:
- a plurality of wood grain strips, spirally wrapped and interlaced on the main stem by the wrapped wire.

3. The artificial tree branch as claimed in claim 1, wherein a plurality of the decorated blades are disposed at two sides of the wrapped wire and distributed at an interval.

4. The artificial tree branch as claimed in claim 1, wherein the wood grain strip is made of Polyvinyl Chloride.

5. The artificial tree branch as claimed in claim 1, wherein the main stem comprises at least one iron wire, the at least one the iron wire is spirally wrapped on the string lights, and the wrapped wire is disposed between the iron wire and the string lights.

6. The artificial tree branch as claimed in claim 1, wherein each of the lamp beads comprises a light emitting diode (LED) patch and encapsulating gel, the LED patch is electrically connected to the lead, and the encapsulating gel encapsulates the LED patch.

7. The artificial tree branch as claimed in claim 6, wherein a plurality of mounting areas are disposed along an axis of the lead and each of the mounting areas has the LED patch soldered thereon.

8. The artificial tree branch as claimed in claim 7, wherein the lead comprises a positive wire, a first signal wire, a second signal wire, a negative wire, and an insulating layer; wherein the insulating layer respectively encapsulates the positive wire, the first signal wire, the second signal wire, and the negative wire.

9. The artificial tree branch as claimed in claim 8, wherein each of the mounting areas is composed of a positive solder point, a first signal solder point, a second signal solder point, and a negative solder point; wherein the positive solder point is disposed to contact the positive wire, the first signal solder point is disposed to contact the first signal wire, the second signal solder point is disposed to contact the second signal wire, the negative solder point is disposed to contact the negative wire, and the first signal wire between the two first signal solder points and the second signal wire between the two second signal solder points are alternately disposed along the axis of the lead.

10. The artificial tree branch as claimed in claim 9, wherein the first signal wire between the two first signal solder points and the second signal wire between the two second signal solder points are alternately disposed along the axis of the lead.

11. The artificial tree branch as claimed in claim 10, wherein the plurality of LED patches comprises a plurality of first LED patches and a plurality of second LED patches; wherein the plurality of first LED patches and the plurality of second LED patches are alternately disposed along the axis of the lead.

12. The artificial tree branch as claimed in claim 11, wherein the plurality of the first LED patches and the plurality of the second LED patches are electrically connected to each other in series.

13. The artificial tree branch as claimed in claim 12, wherein each of the first LED patches and each of the second LED patches respectively have a positive solder pin, a signal inputting solder pin, a signal outputting solder pin, and a negative solder pin, the positive solder pin is soldered on the positive solder point of the mounting area, and the negative solder pin is soldered on the negative solder point of the mounting area.

14. The artificial tree branch as claimed in claim 13, wherein the signal inputting solder pins of the first LED patches are soldered on the first signal solder points of the mounting areas, and the signal outputting solder pins of the first LED patches are soldered on the second signal solder points of the mounting areas.

15. The artificial tree branch as claimed in claim 14, wherein the signal inputting solder pins of the second LED patches are soldered on the first signal solder points of the mounting areas, and the signal outputting solder pins of the second LED patches are soldered on the first signal solder points of the mounting areas.

16. The artificial tree branch as claimed in claim 15, wherein one of the signal outputting solder pins of the first LED patches is electrically connected to one of the signal inputting solder pins of the second LED patches via the second signal wire, and one of the signal outputting solder pins of the second LED patches is electrically connected to one of the signal inputting solder pins of the first LED patches via the first signal wire.

17. The artificial tree branch as claimed in claim 16, wherein the first signal wire between the two adjacent first signal solder points and the second signal wire mounted between the two adjacent second signal solder points are alternately disconnected along an axis of the lead.

18. The artificial tree branch as claimed in claim 7, wherein the positive solder point, the first signal solder point, the second signal solder point and the negative solder point are formed in a folded shape.

* * * * *